(12) United States Patent
Rosendahl

(10) Patent No.: US 10,184,592 B1
(45) Date of Patent: Jan. 22, 2019

(54) GUTTER DOWNSPOUT EXTENSION HOLDING DEVICE

(71) Applicant: Robert Rosendahl, Menomonie, WI (US)

(72) Inventor: Robert Rosendahl, Menomonie, WI (US)

( * ) Notice: Subject to any disclaimer, the term of this patent is extended or adjusted under 35 U.S.C. 154(b) by 0 days.

(21) Appl. No.: 15/923,745

(22) Filed: Mar. 16, 2018

(51) Int. Cl.
*F16L 3/00* (2006.01)
*F16L 3/12* (2006.01)
*E04D 13/08* (2006.01)

(52) U.S. Cl.
CPC ............ *F16L 3/1222* (2013.01); *E04D 13/08* (2013.01); *F16L 3/006* (2013.01); *E04D 2013/0806* (2013.01)

(58) Field of Classification Search
CPC ..... E04D 13/08; E04D 13/076; E04D 13/064; E04D 13/0645
USPC ................. 248/48.1, 87, 49, 65, 74.3; 52/16
See application file for complete search history.

(56) References Cited

U.S. PATENT DOCUMENTS

| | | | |
|---|---|---|---|
| 3,572,622 A | 3/1971 | Smith | |
| D342,016 S * | 12/1993 | Ziegelmann | D30/154 |
| 5,437,424 A * | 8/1995 | Netz, Sr. | F16L 3/00 248/49 |
| 6,012,682 A | 1/2000 | Tredennick | |
| 6,823,894 B1 | 11/2004 | Koller et al. | |
| 7,739,839 B1 | 6/2010 | Crabtree | |
| 9,238,916 B2 | 1/2016 | Schneider | |
| 9,399,849 B2 | 7/2016 | Langenderfer | |
| 2007/0204522 A1 | 9/2007 | Tredennick | |
| 2011/0173897 A1* | 7/2011 | Schneider | E04D 13/08 52/16 |
| 2013/0104465 A1* | 5/2013 | Gazlay | E02D 5/80 52/155 |
| 2014/0284433 A1 | 9/2014 | Gazlay | |
| 2015/0048222 A1* | 2/2015 | Eley | A01G 9/28 248/87 |

* cited by examiner

*Primary Examiner* — Steven M Marsh
(74) *Attorney, Agent, or Firm* — Anthony J Bourget

(57) ABSTRACT

A gutter extension holding device which inserts at a terminal portion of a gutter extension includes a connecting piece or cap having four side portions which operate as a collar around the extension and at least one tab extending rearward and defining a channel configured to receive a terminal end of the extension. The device includes a stake to insert in the ground to retain the extension in position. The channel is tapered to accommodate a friction fit of the inserted extension, and a frame outlines a flow opening of the device against which the extension abuts. In one aspect three tabs are configured to receive the extension, where a bottom side portion is devoid of a tab to accommodate uninhibited flow of water or materials from the extension.

20 Claims, 6 Drawing Sheets

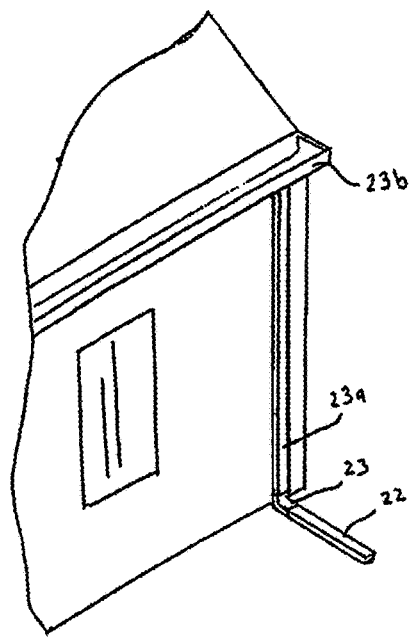
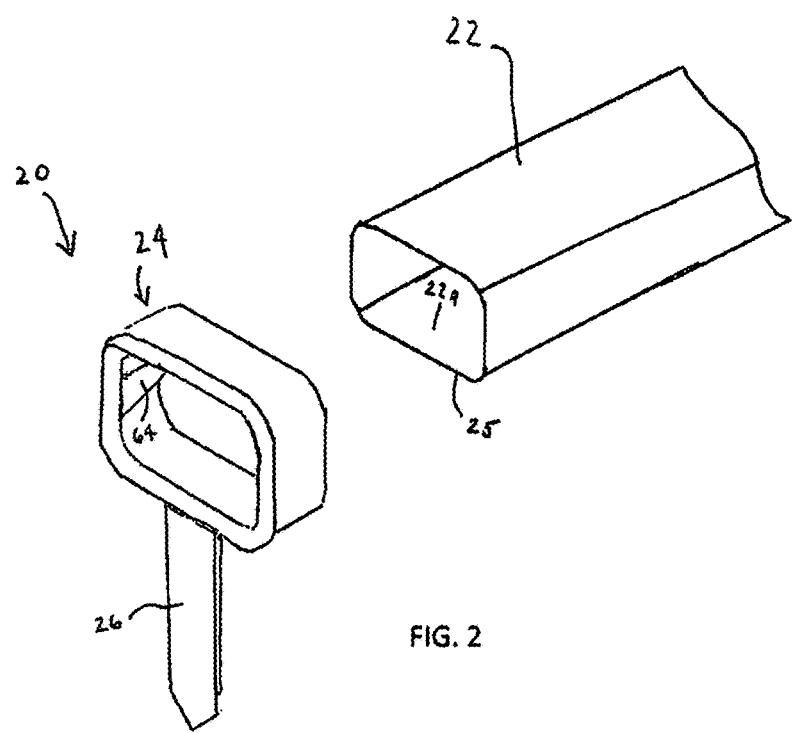
FIG. 1 (Prior Art)
FIG. 2

GUTTER DOWNSPOUT EXTENSION HOLDING DEVICE

BACKGROUND OF THE INVENTION

1. Field of the Invention

This invention relates to a downspout extension cover and holding device.

2. Background Information

Gutter downspouts commonly use an extension piece to assist in moving the rainwater to a position away from the house or building to which the gutter is attached. The extension typically fits into an elbow at the base of the downspout. The extension is sometimes friction-fit onto the downspout elbow or otherwise secured with a fastener. The extension extends outward from the house or building. In many cases the extension will detach from the elbow and blow away especially when there are heavy winds. The extension is often damaged by a weed trimmer or causes damage to a weed trimmer or other machines contacting the extension. The extension also includes sharp and sometimes hazardous edges. There have been a variety of devices used to attempt securing an extension into position or to cover the sharp edges, such as the device shown in U.S. Pat. No. 9,238,916. While some device have benefits, there is room for improvement.

SUMMARY OF THE INVENTION

In one aspect the invention is a device configured to keep a gutter downspout extension securely in place, and includes a sleeve or cap which slides over the end of the extension and includes a downward-extending ground stake for insertion of the device into the ground. The installed device prevents the downspout extension from separating from the gutter downspout elbow to which it is attached. Staking the device keeps the device connected to the extension, and keeps the extension connected to the downspout.

In a further aspect the invention includes a gutter extension connecting piece having side portions, including a bottom portion, where the side portions are arranged in a substantially rectangular configuration defining a flow chamber therethrough, a frame positioned at a front of at least one of the side portions and a tab extending rearward form the frame and into the flow chamber, the tab spanning a length which is shorter than a longest length of the frame, and a stake connected to and extending downward from the bottom portion. In one aspect the tab narrows rearwardly. In one aspect the tab and at least one of the side portions defines a channel. In one aspect the channel expands rearwardly. In a further aspect the sides join at respective corners and the corners are open such that respective corners of an inserted gutter extension are able to contact the respective corners of the connecting piece.

In a further aspect of the invention the device is made of a rigid plastic which resists damage due to weed trimmers or other equipment. In a further aspect the device of the present invention is made of a single piece of integrally connected substantially rigid plastic. In one aspect the device is made of polyvinyl chloride PVC.

In a further aspect the invention includes a set of 3 internal "tabs" which allow for easy insertion of the device onto the end of the downspout extension. The lower-most internal side of the device is smooth (i.e., the side closest to the stake does not include a tab) so that debris is free to flow from the extension and device without interruption.

The above partial summary of the present invention is not intended to describe each illustrated embodiment, aspect, or every implementation of the present invention. The figures and detailed description and claims that follow more particularly exemplify these and other embodiments and further aspects of the invention.

BRIEF DESCRIPTION OF THE DRAWINGS

FIG. 1 is a perspective view of prior art showing a gutter extension connected to an elbow in turn connected to a downspout of a gutter system.

FIG. 2 is a perspective view of a device made in accordance with one aspect of the present invention and showing connection of the device to an extension or discharge pipe in one operational aspect of the invention.

Figure 3:
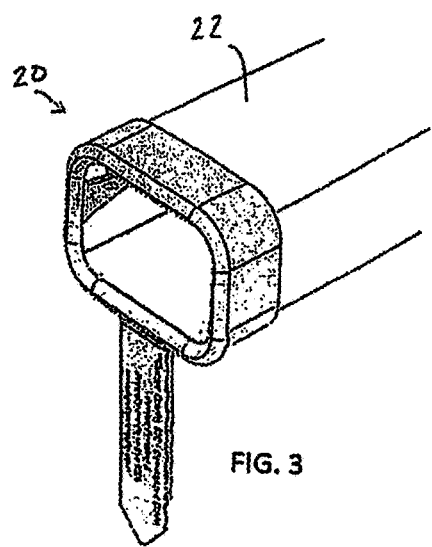
FIG. 3 is a perspective view of the device shown in FIG. 2 and connected to an extension.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-14, aspects of a device for connecting to a gutter extension in accordance with the invention are shown. Gutter extension holding device 20 includes a gutter extension connecting piece 24 and a stake 26. Connecting piece 24 is configured to connect to a gutter extension 22 (See FIG. 1, FIG. 2 and FIG. 3) which in turn typically connects to an elbow 23 at the base of a gutter downspout 23a or gutter system 23b of a house or building. The stake 26 is configured to pierce into the ground to hold device 20 into position while also securing the gutter extension to and against the elbow or house gutter downspout 23a. Connecting piece 24 secures to a terminal end or terminal portion of the gutter extension 22 as described below. Having the stake 26 secured into the ground anchors the terminal portion of the gutter extension 22 in a secure manner, preventing or lessening the tendency for the extension 22 to be detached from the elbow 23.

Figure 4:
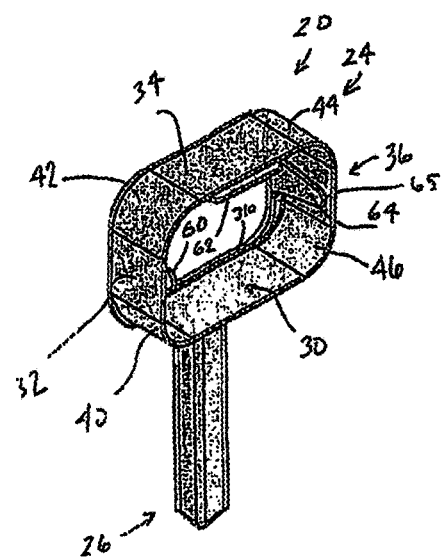
FIG. 4 is a reverse perspective view of the device of FIG. 2.

Referring to FIG. 4, which is a reverse or back-side perspective view of device 20, stake 26 connects to and extends downward from connecting piece 24 at a bottom side portion 30. Connecting piece 24 includes the bottom side portion 30, a left side portion 32, top side portion 34 and right side portion 36. The side portions 30, 32, 34, and 36 are arranged in a substantially rectangular configuration defining a flow chamber 38. The rectangular configuration is oriented to receive a terminal portion of the gutter extension which may be of a standard size. Flow chamber 38 receives a terminal portion of the extension 22 and allows water and debris from the gutter system 23b and extension 22 to freely pass through connecting piece 24. In one aspect the side portions 30, 32, 34, 36 are joined at relatively sharp angles or corners, and in other aspects as shown in FIG. 4 the side portions connect at rounded corners, such as at first corner portion 40, second corner portion 42, third corner portion 44 and fourth corner portion 46.

Figure 5:
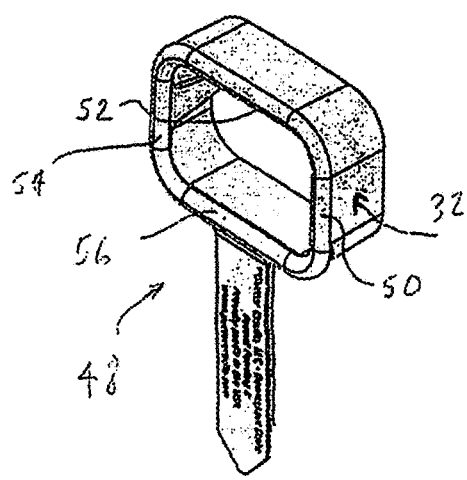
FIG. 5 is a perspective view of the device show in FIG. 4.
Figure 6:
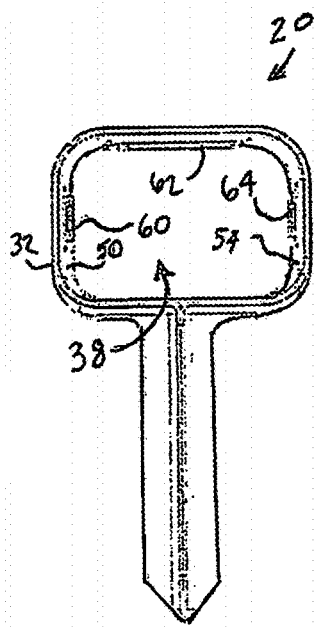
FIG. 6 is a rear view of the device of FIG. 2.

Referring to FIG. 5, connecting piece 24 further includes a first frame 50 which is positioned at a front of left side portion 32 and projects inward toward right side portion 36. A second frame 52 is positioned at a front of top side portion 34 and projects toward bottom side portion 30. A third frame 54 is positioned at a front of right side portion 36 and projects toward left side portion 32. In one aspect of the invention, a fourth frame 56 is positioned at a front of bottom side portion 30 and projects toward top side portion 34. In one aspect, fourth frame 56 comprises a small lip 31a which extends slightly above a top surface 31 of bottom side 30. Lip 31a in one aspect extends above surface 31 a distance equal to or substantially equal to a thickness of the material comprising one side of the extension piece 22 which is inserted into connecting piece 24. In this manner the lip 31a and inside surface 22a of the extension piece are flush or align along a common plane to present a smooth surface. Such smooth surface advantageously allows water and materials to freely exit the flow chamber 38 and avoid interruption or being trapped against connecting piece 24. Such smooth configuration lessens clogging of the gutter extension 22. But for such smooth or flush arrangement, leaves or other debris attempting to exit the extension piece would or could potentially catch against or along the front side of device 20. In other aspects, fourth frame 56 simply comprises a terminal front edge of bottom side portion 30 and does not include a lip 31a. In such "no-lip" configuration the terminal edge 25 of a bottom surface of the extension piece 22 when inserted into device 20 will be exposed to view from a front side 48 of device 20.

With reference to FIGS. 4-12, first frame 50 extends inward from left side portion 32 and includes a first tab 60. Tab 60 extends rearward from first frame 50 and into the flow chamber 38. Second frame 52 includes a second tab 62 extending rearward and third frame 54 includes a third tab 64 extending rearward. Tab 60, frame 50 and left side portion 32 define a first channel 70. Tab 62, frame 52 and top side portion 34 define a second channel 72. Tab 64, frame 54 and right side portion 36 define a third channel 74. As shown in FIG. 4, third tab 64 extends rearward a distance which is less than a depth of right side portion 36. In one aspect, tab 64 (and tabs 60, 62) tapers or narrows rearwardly as shown in FIG. 4. Tab 64 includes a rearward edge 65 which in one instance is rounded as shown. In one aspect, tab 64 (and/or tabs 60, 62) has a material thickness (represented by arrow "t" in FIG. 9) which is equal to or substantially equal to the thickness of right side portion 36 (and/or equal to or substantially equal to thickness "t" of left side portion 32 in the case of tab 60). In one aspect channel 70 spans from left side portion 32 to first tab 60 a distance configured to receive a front edge portion of a side of the extension piece 22 to be inserted into connecting piece 24 (or connecting piece 24 is inserted upon the extension piece).

The configuration of device 20 accommodates efficient insertion onto extension 22. Particularly, device 20 will firmly friction fit onto the terminal portion of an extension 22, yet such firm fitting is very easy to accomplish. In some instance an extension 22 will have jagged or bent or wrinkled edges such that an opening of the extension 22 will not be uniformly rectangular or will have some side walls or corners that are misaligned. The end portion of an extension 22 may also be deformed due to being stepped upon or otherwise the end portion becomes misshaped. Heretofore the misshaped terminal portion of the extension 22 makes insertion of an end cap device difficult or impossible, or requires the misshaped side portions to first be bent or smoothed back into the original rectangular configuration in order for a cap to be placed on the end of the extension 22. Device 20 is configured to allow for easy friction fit insertion of an extension 22 while automatically or simultaneously reforming or at least urging or partially urging the reformation of the terminal end of the extension 22 to be squared or rectangularly repositioned during the insertion of device 20 onto extension 22. In some aspects, sliding the extension 22 into the connecting piece 24 reforms edges of the extension without having to use tools. As is described further below, extension 22 friction fits into channels 70, 72, 74 despite irregularities that may exist at the terminal corner portions of the extension 22.

Figure 9:
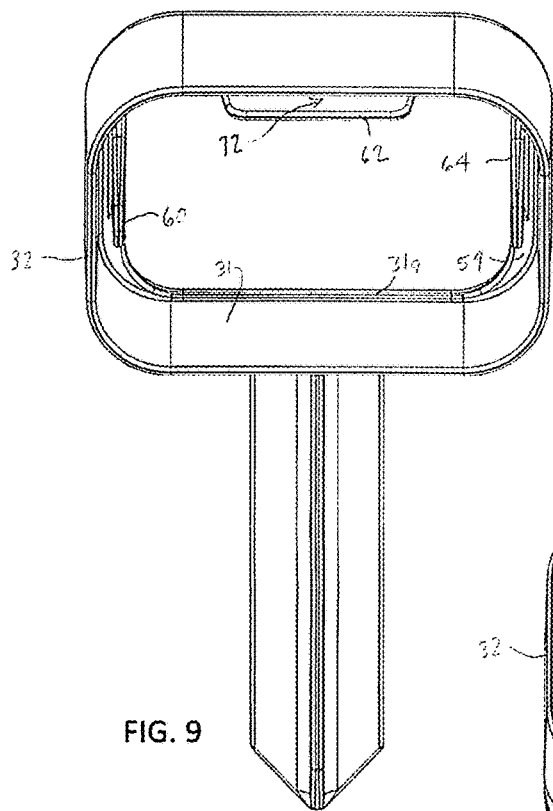
FIG. 9 is a top perspective view of the device of FIG. 2.
Figure 10:
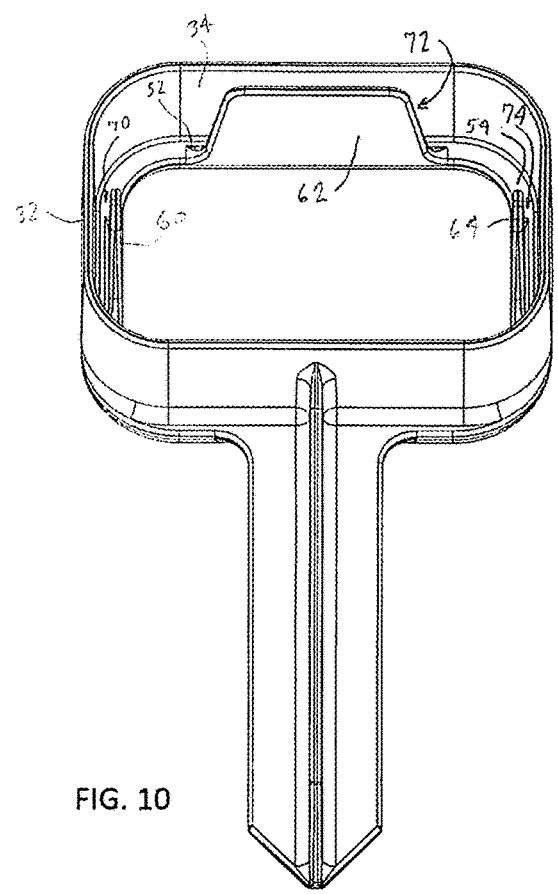
FIG. 10 is a bottom perspective view of the device of FIG. 2.
Figure 11:
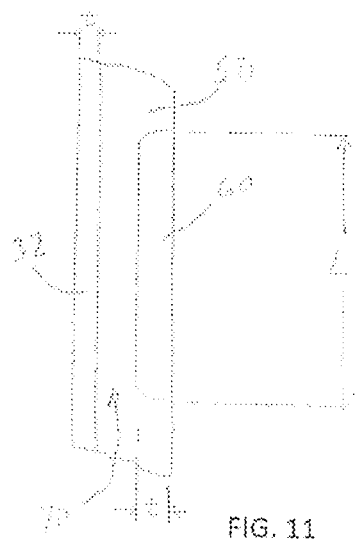
FIG. 11 is an enlarged partial rear view of aspects of the device of FIG. 2 in accordance with the invention.
Figure 12:
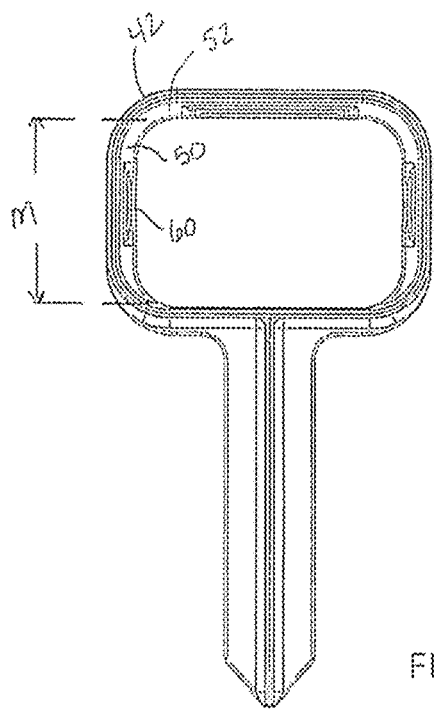
FIG. 12 is a rear view of the device of FIG. 2.

As shown in FIG. 9 and FIG. 10, first frame 50 has a length "M". It may be appreciated that frame 50 integrally connects with second frame 52. In the present example, the length "M" of first frame 50 spans from bottom side portion 30 to a lower edge of the second frame 52 connected to top side portion 34. In one aspect, first tab 60 has a length "L" which is less than or shorter compared to length "M". Such shortened length for first tab 60 accommodates for ease of insert of terminal portion of extension 22. Particularly, first frame 50 and second frame 52 are devoid of a tab element or elements at second corner portion 42. Such open area along the frame at corner portion 42 makes insertion of extension 22 relatively easy at such location even if the corresponding corner portion of extension 22 is misshaped. For instance, if the corresponding corner portion of extension 22 is bent or wrinkled, or if adjacent panels of extension 22 are oriented at a deformed or sharp angles, there is sufficient clearance at corner portion 42 to allow extension 22 to nonetheless insert into connecting piece 24. Further, channel 70 assists in guiding a panel of extension 22 into secure position. In one aspect, the width of channel 70 will be narrow closer to front side 48 as compared to the width of channel 70 at a rear of the connecting piece 24. In one instance a slight taper is used to provide a relatively easy entry into the channel 70 while progressively narrowing to accommodate a gradual friction fit and tightening against sides of the inserted panel of extension 22. The width of channel 70 at or toward the front side 48 is configured to correspond to a standard material width of a panel of a typical extension 22. The channels in one aspect expand rearwardly (i.e., become wider closer to the rear of the device 20). In some aspects the thickness of the material of a side of an aluminum extension is 0.019 inches to 0.032 inches (with different thickness options, such as 0.019, 0.024, 0.027, 0.032). The channels 70, 72, 74 in some aspects are configured to receive an extension of any particular size thickness. The channels 70, 72, 74 defined above are likewise configured to receive panels of a typical extension 22 via friction fit. The tabs 62, 64 extending along respective frames 52, 54 also have a shorter length compared to the lengths of their respective frames 52, 54, so that corner portions 44, 46, 40 may also be devoid of tabs or elements that would otherwise impede insertion of extension into connecting piece 24.

In one aspect device 20 is made of hardened plastic, such a PVC or other rigid or substantially rigid material. Such hardened plastic accommodates aggressively inserting device 20 upon an end of extension 22 by relatively great force, if necessary, to align deformed panels or deformed corners/edges of extension 22 into alignment with the channels 70, 72, 74 of connecting piece 24. If necessary, the smooth hardened plastic allows a user to force the device 20 onto an extension without harm to the person's hand. The side portions 30, 32, 34, 36 operate in conjunction with tabs 60, 62, 64 to guide the inserted extension 22 into the channels 70, 72, 74. In one instance the terminal edges of an inserted extension 22 will abut against frame members 50, 52, 54 and optionally 56 if present. A user may apply force to the front side 48, via pounding upon connecting piece 24 with the palm of a hand if necessary, to easily and secure device 20 to extension 22. In many instances where extension 22 is not misshaped, insertion of device is swift and requires very little force yet results in a secure friction-fit connection. A user may hear the extension 22 bottom out against at least one or more the frame elements 50, 52, 54, 56.

Figure 7:
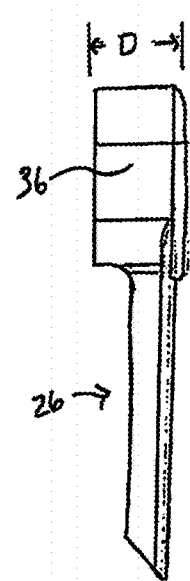
FIG. 7 is a left side view of the device of FIG. 2.
Figure 8:
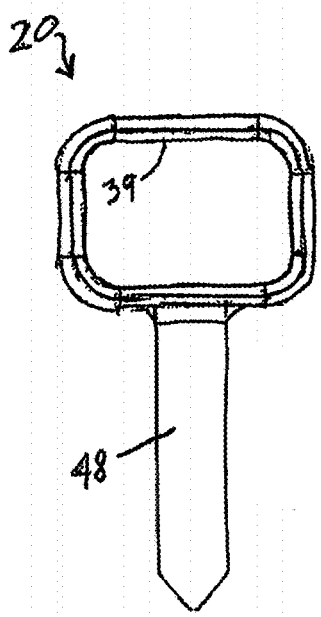
FIG. 8 is a front view of the device of FIG. 2.

In one aspect, the side portions 30, 32, 34 and 36 have a depth of about 1 to 1½ inches, spanning from front side 48 to rear. As shown in FIG. 7, depth is represented by arrow "D", and in that example is about 1¼ inches. Such depth provides sufficient or a desired depth of channels 70, 72, 74 to accommodate a sufficient or desired friction fit of extension 22. The stake 26 has a depth which is less than depth "D", and together with the connecting piece 24, device 20 has a total height of about 5½ to 7½ inches, and in the example of FIG. 7 about 6 inches. The rounded corner portions 40, 42, 44, 46 provide smooth aspects for safety protection, and the frame elements 50, 52, 54, 56 provide safety protection from a sharp terminal edges of extension 22. The hardened plastic provides a rigid structural protection to avoid or reduce crushing of a terminal portion of extension 22 such as by a person stepping upon or object contacting the terminal portion. Having the device 20 anchored into the ground via stake 26 provides further security to extension 22 and reduces or eliminates detachment of extension 22 from elbow 23. Having device 20 anchored into the ground via stake 26 also allows for a house-ward force to be applied against extension 22 to further secure extension 22 against elbow 23 and the house or building. Use of device 20 accommodates for easy retraction of stake 26 from the ground for swift removal of extension 22 from the elbow 23 in order to perform yard maintenance (mowing or trimming, etc) or repair. Device 20 allows for quick and effective reattachment of extension 22 to elbow 23 when maintenance or repair is completed.

Figure 13:
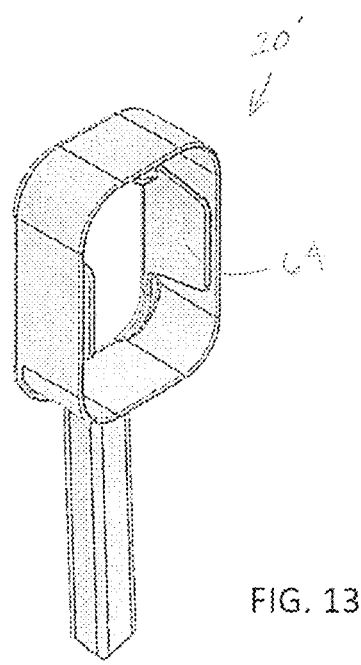
FIG. 13 is a rear perspective view of a device in accordance with a further aspect of the invention.
Figure 14:
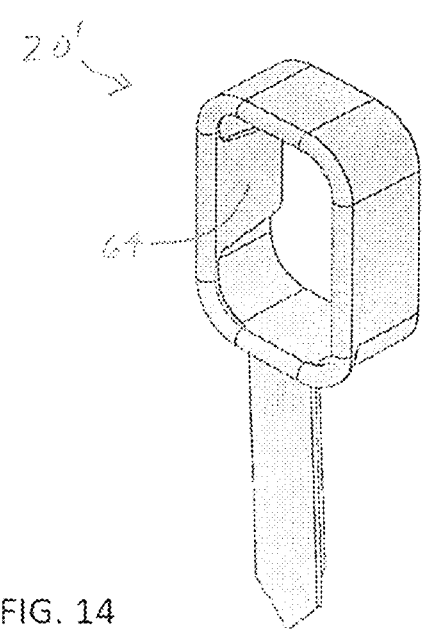
FIG. 14 is a perspective view of the device of FIG. 13.

In one aspect device 20 is configured to be placed upon the terminal portion of an extension 22 having a dimension of 3 inches by 4 inches, and oriented to lay as presented in FIG. 2. In other aspects, device 20 is configured to receive extensions 22 having greater or lesser dimensional measures, depending on the scale of gutter system being used. In a further aspect of the invention as shown in FIG. 13-14, device 20' is configured to receive an extension 22 in a primarily vertical orientation. Such vertically oriented device 20' may be configured to accommodate a standard 3 inches by 4 inches extension 22, or configured to receive extensions 22 greater or lesser dimensional measures. The device 20' includes a connecting piece which is the same or similar to the connecting piece 24 described above, yet being oriented in a relatively vertical configuration as shown.

It should be understood, of course, that the foregoing relates to exemplary embodiments of the invention and that modifications may be made without departing from the spirit and scope of the invention as set forth in the following claims.

What is claimed is:

1. A gutter extension holding device, comprising:
a gutter extension connecting piece comprising:
a bottom side portion connected to a left side portion connected to a top side portion connected to a right side portion connected to the bottom side portion and arranged in a substantially rectangular configuration defining a flow chamber;
a first frame positioned at a front of the left side portion, a first tab extending rearward from the first frame and into the flow chamber, a second frame positioned at a front of the top side portion, a second tab extending rearward from the second frame and into the flow chamber, a third frame positioned at a front of the right side portion, a third tab extending rearward from the third frame and into the flow chamber, at least one of the first tab, second tab and third tab spanning a length which is shorter than a longest length of the respective first frame, second frame or third frame; and
a stake connected to and extending downward from the gutter extension connecting piece at the bottom side portion.

2. The device of claim 1 where the bottom side portion and left side portion are connected at a first corner portion, the left side portion connected to the top side portion at a second corner portion, at least a portion of the first frame and second frame extending inward from the second corner portion, the second corner portion devoid of a rearwardly extending tab.

3. The device of claim 1 where the first frame spans a frame length from the bottom side portion to a lower edge of the second frame, the first tab, first frame and left side portion define a channel, the channel spanning only partially the frame length.

4. The device of claim 1 where the first tab in part defines a first channel, the second tab in part defines a second channel and the third tab in part defines a third channel.

5. The device of claim 4 where at least one of the tabs narrows rearward.

6. The device of claim 4 where at least one of the channels expands rearward.

7. The device of claim 1 further comprising a fourth frame positioned at a front of the bottom side portion, the fourth frame extending upward such that no portion of the fourth frame is positioned upward of an inside surface of a gutter extension inserted into the connecting piece.

8. The device of claim 7 where the fourth frame has an upper terminal edge, the upper terminal edge being exposed despite the gutter extension inserted into the connecting piece.

9. The device of claim 1 where the bottom side portion, left side portion, top side portion and right side portion meet at respective corners, the corners devoid of any rearwardly extending tabs.

10. A gutter extension holding device, comprising:
a gutter extension connecting piece comprising:
- a bottom side portion connected to a left side portion connected to a top side portion connected to a right side portion connected to the bottom side portion and arranged in a substantially rectangular configuration defining a flow chamber;
- a first frame positioned at a front of the left side portion, a first tab extending rearward from the first frame and into the flow chamber, a second frame positioned at a front of the top side portion, a second tab extending rearward from the second frame and into the flow chamber, a third frame positioned at a front of the right side portion, a third tab extending rearward from the third frame and into the flow chamber, at least one of the first tab, second tab and third tab narrows rearwardly; and a stake connected to and extending downward from the gutter extension connecting piece at the bottom side portion.

11. The device of claim 10 where at least one of the first tab, second tab and third tab and a respective one of the first frame, second frame and third frame at least in part define a channel, the channel expanding rearward.

12. A gutter extension holding device, comprising:
a gutter extension connecting piece comprising:
- a bottom side portion connected to a left side portion connected to a top side portion connected to a right side portion connected to the bottom side portion and arranged in a substantially rectangular configuration defining a flow chamber;
- a frame positioned at a front of at least one of the left side portion, top side portion or right side portion, a tab extending rearward from the frame and into the flow chamber, the tab spanning a length which is shorter than a longest length of the frame; and a stake connected to and extending downward from the gutter extension connecting piece at the bottom side portion.

13. The device of claim 12 where the tab narrows rearward.

14. The device of claim 12 where the tab and the at least one of the left side portion, top side portion or right side portion at least in part define a channel, the channel expands rearward.

15. The device of claim 14 where the at least another tab and at least one of the left side portion, top side portion or right side portion at least in part defines another channel, the another channel expands rearward.

16. The device of claim 15 where the channel and the at least another channel are configured to receive via friction fit a terminal edge of a gutter extension inserted into the connecting piece.

17. The device of claim 12 having at least another frame positioned at a front of at least one of the left side portion, top side portion or right side portion, at least another tab extending rearward from the at least another frame and into the flow chamber, the at least another tab spanning a length which is shorter than a longest length of the at least another frame.

18. The device of claim 15 where the tab and the at least another tab narrow rearwardly.

19. The device of claim 12 where the bottom side portion, left side portion, top side portion and right side portion meet at respective corners, the corners devoid of any rearwardly extending tabs.

20. The device of claim 12 wherein the device is made of a single piece of integrally connected substantially rigid plastic.

* * * * *